(12) United States Patent
Hung et al.

(10) Patent No.: US 9,683,887 B2
(45) Date of Patent: Jun. 20, 2017

(54) PHOTOELECTRIC CONVERSION DEVICE WITH IMPROVED ALIGNMENT PRECISION AND OPTICAL FIBER COUPLING CONNECTOR HAVING THE SAME

(71) Applicant: ScienBizP Consulting (Shenzhen) Co., Ltd., Shenzhen (CN)

(72) Inventors: Yi Hung, New Taipei (TW); Li-Ying Wang He, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 123 days.

(21) Appl. No.: 14/659,102

(22) Filed: Mar. 16, 2015

(65) Prior Publication Data

US 2015/0268093 A1 Sep. 24, 2015

(30) Foreign Application Priority Data

Mar. 21, 2014 (TW) .............................. 103110597 A

(51) Int. Cl.
*G01J 1/04* (2006.01)
*G01J 1/02* (2006.01)
*G02B 6/42* (2006.01)

(52) U.S. Cl.
CPC ........... *G01J 1/0411* (2013.01); *G01J 1/0271* (2013.01); *G01J 1/0403* (2013.01); *G01J 1/0407* (2013.01); *G01J 1/0425* (2013.01); *G02B 6/428* (2013.01); *G02B 6/4214* (2013.01); *G02B 6/4292* (2013.01); *G02B 6/4204* (2013.01)

(58) Field of Classification Search
CPC ...... G01J 1/0271; G01J 1/0403; G01J 1/0407; G01J 1/0411; G01J 1/0425; G02B 6/4204; G02B 6/4214; G02B 6/428; G02B 6/4292
See application file for complete search history.

(56) References Cited

U.S. PATENT DOCUMENTS

2004/0114866 A1* 6/2004 Hiramatsu ........... G02B 6/4292
385/39
2006/0274997 A1* 12/2006 Furuno ................ G02B 6/4204
385/89

\* cited by examiner

*Primary Examiner* — Francis M Legasse, Jr.
(74) *Attorney, Agent, or Firm* — Steven Reiss

(57) ABSTRACT

A photoelectric conversion device includes a circuit board, a light emitting module, a light receiving module, and an optical coupling lens. The circuit board includes two positioning portions apart from each other. The light emitting module and the light receiving module are mounted on the circuit board, and are spaced apart from each other. The optical coupling lens includes a bottom surface facing the light emitting module and the light receiving module, two first converging portions formed on the bottom surface, and two locating portions. Centers of the positioning portions are aligned with centers of the locating portions to ensure perfect alignment of the light emitting module and the light receiving module with the first converging portions.

15 Claims, 4 Drawing Sheets

000000# PHOTOELECTRIC CONVERSION DEVICE WITH IMPROVED ALIGNMENT PRECISION AND OPTICAL FIBER COUPLING CONNECTOR HAVING THE SAME

FIELD

The subject matter herein generally relates to optic technologies and, particularly, to a photoelectric conversion device and an optical fiber coupling connector having the photoelectric conversion device.

BACKGROUND

An optical fiber coupling connector includes a photoelectric conversion device and optical fibers. The transmission efficiency of light depends on the alignment precision between the various internal components. In particular, the higher the alignment precision is, the higher is the transmission efficiency.

BRIEF DESCRIPTION OF THE DRAWINGS

Implementations of the present technology will now be described, by way of example only, with reference to the attached figures.

DETAILED DESCRIPTION

Figure 1:
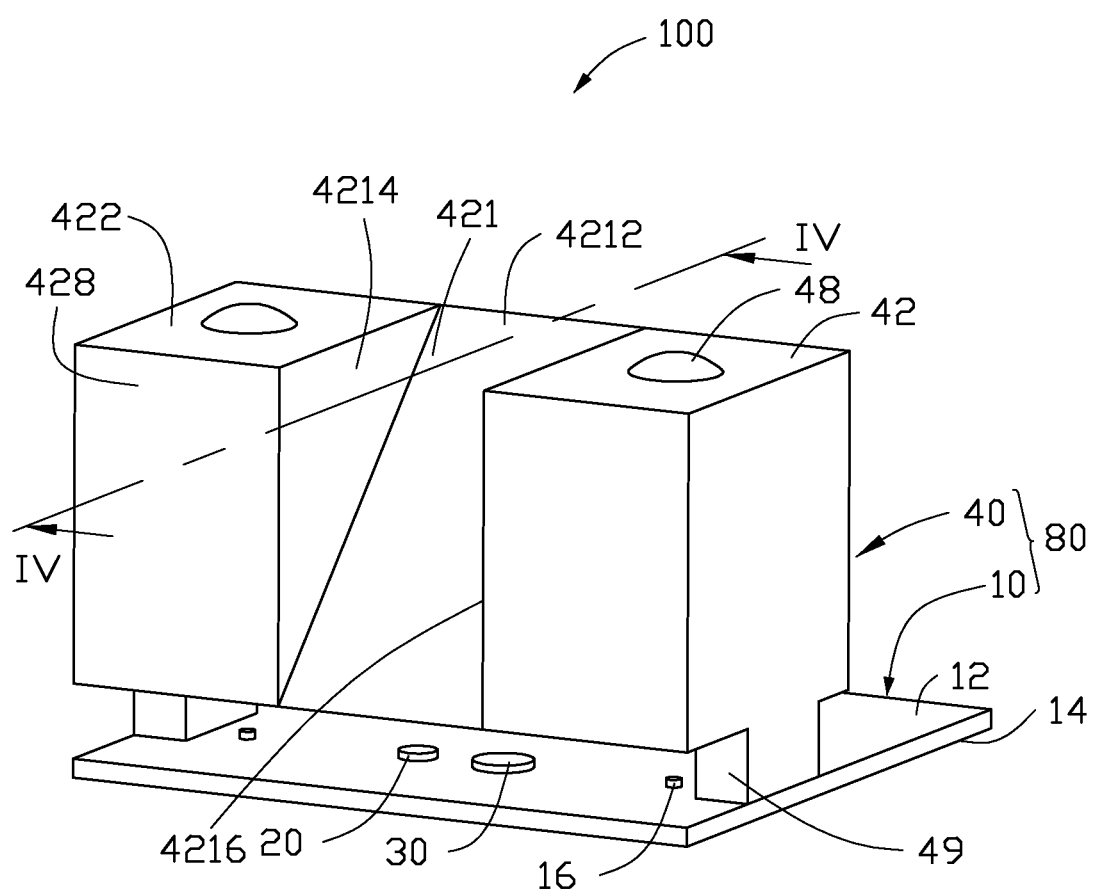
FIG. 1 is an isometric view of an exemplary embodiment of an optical fiber coupling connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like.

Embodiments of present disclosure are described in relation to a photoelectric conversion device. The photoelectric conversion device includes a circuit board, a light emitting module, a light receiving module, and an optical coupling lens. The circuit board includes two positioning portions apart from each other. The light emitting module and the light receiving module are mounted on the circuit board, and are spaced apart from each other. The optical coupling lens includes a bottom surface facing the light emitting module and the light receiving module, two first converging portions formed on the bottom surface, and two locating portions. Centers of the positioning portions are aligned with centers of the locating portions to ensure perfect alignment of the light emitting module and the light receiving module with the first converging portions.

Embodiments of the present disclosure are also described in relation to an optical fiber coupling connector. The optical fiber coupling connector includes a photoelectric conversion device and two optical fibers. The photoelectric conversion device includes a circuit board, a light emitting module, a light receiving module, and an optical coupling lens. The circuit board includes two positioning portions apart from each other. The light emitting module and the light receiving module are mounted on the circuit board, and are spaced apart from each other. The optical coupling lens includes a bottom surface facing the light emitting module and the light receiving module, two first converging portions formed on the bottom surface, two locating portions, and two second converging portions. Centers of the positioning portions are aligned with centers of the locating portions to ensure perfect alignment of the light emitting module and the light receiving module with the first converging portions.

Figure 2:
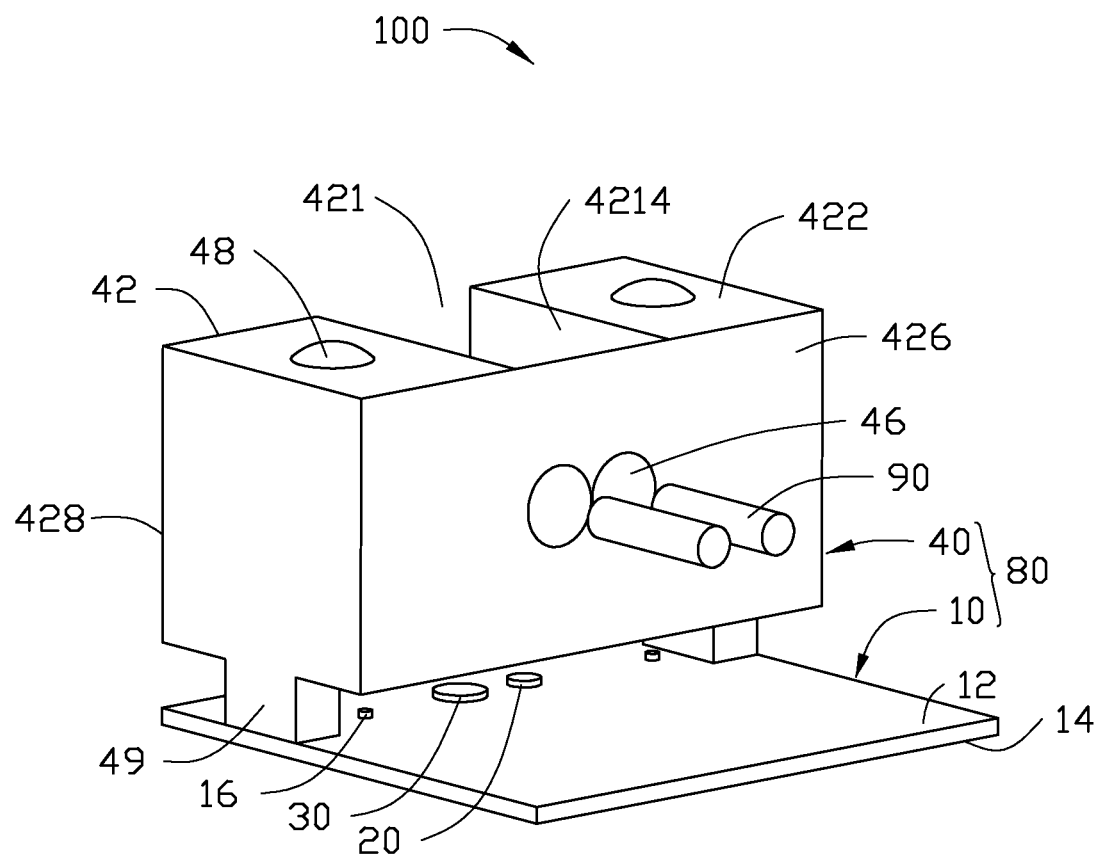
FIG. 2 is similar to FIG. 1, but viewed from another angle.

FIGS. 1 and 2 illustrate an exemplary embodiment of an optical fiber coupling connector 100. The optical fiber coupling connector 100 includes a photoelectric conversion device 80 and two optical fibers 90.

The photoelectric conversion device 80 includes a circuit board 10, a light emitting module 20, a light receiving module 30, and an optical coupling lens 40.

The circuit board 10 includes an upper surface 12 and a lower surface 14. The upper surface 12 and the lower surface 14 are positioned at opposite sides of the circuit board 10, and the upper surface 12 is substantially parallel to the lower surface 14. Two positioning posts 16 are formed on the upper surface 12. The positioning posts 16 perpendicularly extend from the upper surface 12. The positioning posts 16 are cylinders. The cross section of each of the positioning posts 16 is substantially circular. The positioning posts 16 are not limited to be cylinders, and can be circular holes or circular marks or other shapes.

The light emitting module 20 and the light receiving module 30 are mounted on the upper surface 12, and are electrically connected to the circuit board 10. In detail, the light emitting module 20, the light receiving module 30, and the positioning posts 16 are arranged in a straight line, and the light emitting module 20 and the light receiving module 30 are located between the two positioning posts 16. That is, centers of the light emitting module 20, of the light receiving module 30, and of the two positioning posts 16 are arranged in a straight line. In this embodiment, the light emitting module 20 is a vertical cavity surface emitting laser (VCSEL) diode and is configured for emitting light. The light receiving module 30 is a photo diode and is configured for receiving light.

Figure 3:
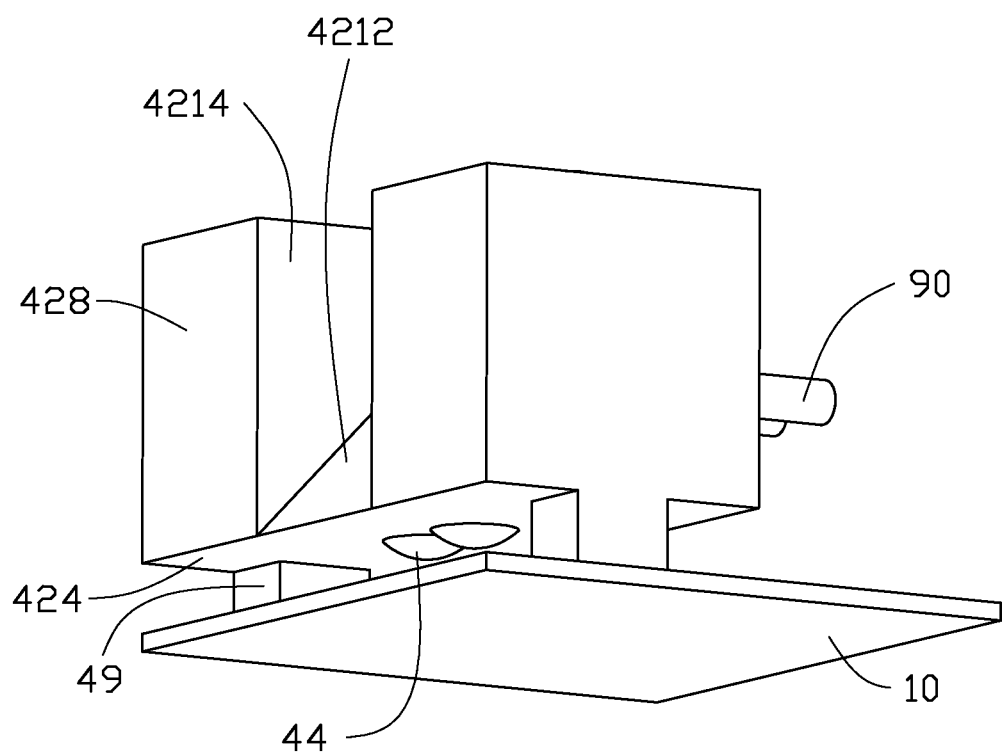
FIG. 3 is similar to FIG. 1, but viewed from alternative angle.

FIGS. 1-3 illustrate that the optical coupling lens 40 includes a body portion 42, two first converging portions 44, two second converging portions 46, two locating portions 48, and two connection poles 49.

The body portion 42 is substantially rectangular and includes a top surface 422, a bottom surface 424, a front surface 426, and a rear surface 428. At least portions of body portion 42 are preferably transparent or translucent to allow light to pass there through where noted herein, and may be entirely transparent or translucent. The top surface 422 and the bottom surface 424 are positioned at opposite sides of the body portion 42, and the top surface 422 is substantially parallel to the bottom surface 424. The front surface 426 and the rear surface 428 are positioned at opposite sides of the body portion 42, and the front surface 426 is substantially parallel to the rear surface 428. The front surface 426 is perpendicularly interconnected between the top surface 422 and the bottom surface 424, and the rear surface 428 is perpendicularly interconnected between the top surface 422 and the bottom surface 424.

The top surface 422 defines a recess 421. The recess 421 passes through the rear surface 428.

FIG. 1 illustrates that the body portion 42 further includes a reflection surface 4212, a first side surface 4214, and a second side surface 4216 in the recess 421. The first side surface 4214 is opposite to the second side surface 4216, and the first side surface 4214 and the second side surface 4216 are connected to the top surface 422 and the reflection surface 4212. The reflection surface 4216 obliquely connects the front surface 426 and the bottom surface 424. An included angle between the reflection surface 4216 and the front surface 426 is about 45 degrees, and an included angle between the reflection surface 4216 and the bottom surface 424 is about 45 degrees.

The two first converging portions 44 are formed on the bottom surface 424, and are spaced apart from each other. The two second converging portions 46 are formed on the front surface 426, and are spaced apart from each other. The two second converging portions 46 correspond to the two first converging portions 44. The two locating portions 48 are formed on the top surface 422, and are arranged at opposite sides of the recess 421. The two connection poles 49 perpendicularly extend from the bottom surface 424, and sandwich the first converging portions 44.

The two optical fibers 90 correspond to and are aligned with the two converging portions 44.

When the optical fiber coupling connector 100 is assembled, first, the light emitting module 20 and the light receiving module 30 are mounted on the upper surface 12, and are electrically connected to the circuit board 10. Second, the optical coupling lens 40 is placed on the upper surface 12. The two connection poles 49 contact the upper surface 12. The two first converging portions 44 is substantially aligned with the light emitting module 20 and the light receiving module 30. Third, the optical coupling lens 40 is moved until the centers of the positioning posts 16 are aligned with the centers of the locating portions 48, while the location of the positioning posts 16 can be observed above the top surface 422. In this situation, the light emitting module 20 and the light receiving module 30 are thus completely aligned with the first converging portions 44. Fourth, glue is applied to sidewalls of the connection poles 49 to fix the optical coupling lens 40 on the upper surface 12. Fifth, the optical fibers 90 are fixed to be aligned with the second converging portions 46. Thereby, the optical fiber coupling connector 100 has a high alignment precision and a high transmission efficiency of light.

Figure 4:
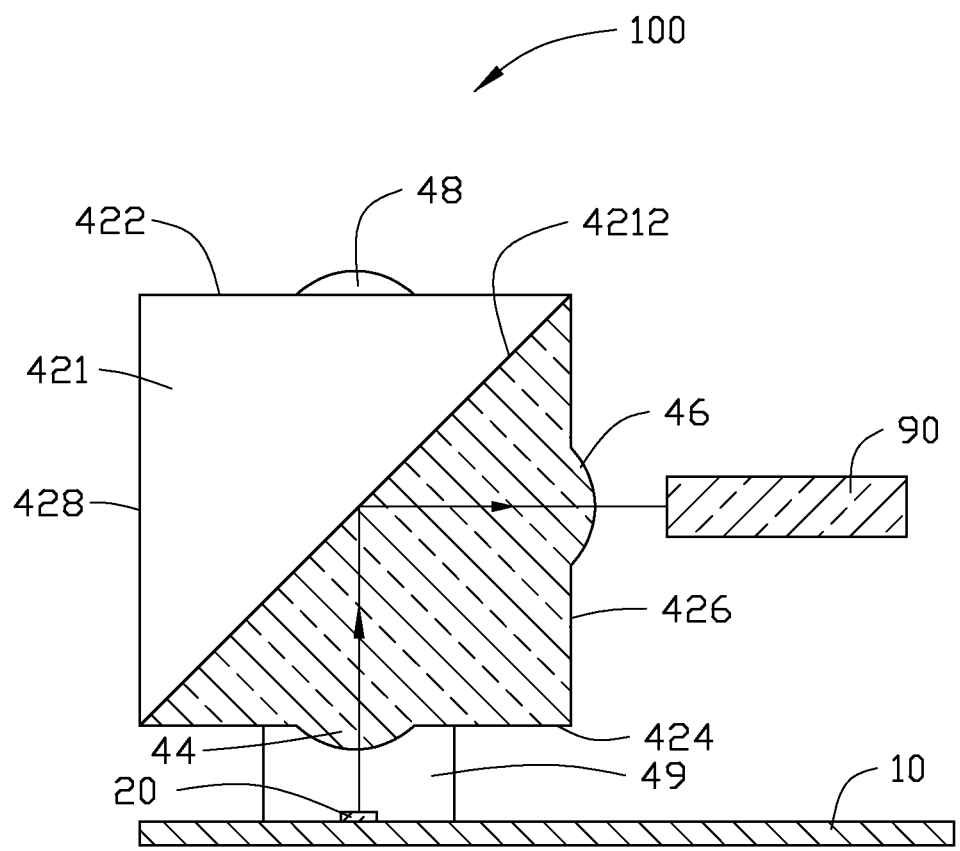
FIG. 4 is a cross sectional view of the optical fiber coupling connector, taken along line IV-IV of FIG. 1.

FIG. 4 illustrates when in use, electrical power is applied to the light emitting module 20 and the light receiving module 30 through the circuit board 10, thus light beams emitted from the light emitting module 20 enter into the first converging portion 44 and become parallel, and are then reflected about 90 degrees toward the corresponding second converging portion 46 by the reflection surface 4212, and are finally converged into the corresponding optical fiber 90 by the corresponding second converging portion 46. Accordingly, light beams from the optical fiber 90 enter into the second converging portion 46 and become parallel, and are then reflected about 90 degrees toward the corresponding first converging portion 44 by the reflection surface 4212, and are finally converged into the light receiving module 30 by the corresponding first converging lens 44.

In other embodiments, the mount of the first converging portion 44, of the second converging portion 46, and of the optical fiber 90 are not limited to be two, and can be more than two, such as, four, six, eight etc. The mount of the first converging portion 44, of the second converging portion 46, and of the optical fiber 90 corresponds to the sum of the light emitting module 20 and the light receiving module 30. Also, the mount of the locating portion 48 and of the positioning post 16 are not limited to be two, and can be more than two.

The embodiments shown and described above are only examples. Many details are often found in the art such as the other features of a photoelectric conversion device and an optical fiber coupling connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A photoelectric conversion device comprising:
a circuit board comprising two positioning portions apart from each other;
a light emitting module mounted on the circuit board;
a light receiving module mounted on the circuit board and being spaced apart from the light emitting module; and
an optical coupling lens comprising a body portion, the body portion comprising a bottom surface, a top surface, a front surface, and a rear surface, the bottom surface opposite to the top surface, the front surface opposite to the rear surface, the top surface defining a recess opening through the rear surface, a reflection surface being formed at a bottom of the recess, the reflection surface obliquely connecting the front surface to the bottom surface, the bottom surface facing the light emitting module and the light receiving module, two first converging portions formed on the bottom surface, the positioning portions visible from the optical coupling lens through the locating portions, such that centers of the positioning portions are aligned with centers of the locating portions to ensure perfect alignment of the light emitting module and the light receiving module with the first converging portions.

2. The photoelectric conversion device of claim 1, wherein the optical coupling lens further comprises two second converging portions formed on the front surface, and the locating portions are formed on the top surface.

3. The photoelectric conversion device of claim 1, wherein the circuit board further comprises an upper surface and a lower surface, the light emitting module and the light receiving module are mounted on the upper surface and are spaced apart from each other, and the optical coupling lens is fixed to the upper surface.

4. The photoelectric conversion device of claim 1, wherein each of the positioning portions is a positioning post.

5. The photoelectric conversion device of claim 2, wherein an included angle between the reflection surface and the bottom surface is about 45 degrees, and an included angle between the reflection surface and the front surface is about 45 degrees.

6. The photoelectric conversion device of claim 3, wherein the light coupling lens is fixed to the circuit board with adhesive, and the light emitting module and the light receiving module are spaced apart from the first converging portions.

7. The photoelectric conversion device of claim 4, wherein each of the positioning portions is substantially cylindrical.

8. An optical fiber coupling connector comprising:
a photoelectric conversion device comprising:
    a circuit board comprising two positioning portions apart from each other;
    a light emitting module mounted on the circuit board;
    a light receiving module mounted on the circuit board and being apart from the light emitting module; and
    an optical coupling lens comprising a body portion comprising two locating portions, the body portion comprising a bottom surface, a top surface, a front surface, and a rear surface, the bottom surface opposite to the top surface, the front surface opposite to the rear surface, the top surface defining a recess opening through the rear surface, a reflection surface being formed at a bottom of the recess, the reflection surface obliquely connecting the front surface to the bottom surface, the bottom surface facing the light emitting module and the light receiving module, two first converging portions formed on the bottom surface, the positioning portions visible from the optical coupling lens through the locating portions, such that centers of the positioning portions are aligned with centers of the locating portions to ensure perfect alignment of the light emitting module and the light receiving module with the first converging portions; and
two optical fibers aligned with the two second converging portions.

9. The optical fiber coupling connector of claim 8, wherein the optical coupling lens further comprises two second converging portions formed on the front surface, and the locating portions are formed on the top surface.

10. The optical fiber coupling connector of claim 8, wherein the circuit board further comprises an upper surface and a lower surface, the light emitting module and the light receiving module are mounted on the upper surface and are spaced apart from each other, and the optical coupling lens is fixed to the upper surface.

11. The optical fiber coupling connector of claim 8, wherein each of the positioning portions is a positioning post.

12. The optical fiber coupling connector of claim 9, wherein an included angle between the reflection surface and the bottom surface is about 45 degrees, and an included angle between the reflection surface and the front surface is about 45 degrees.

13. The optical fiber coupling connector of claim 10, wherein the light coupling lens is fixed to the circuit board with adhesive, and the light emitting module and the light receiving module are spaced apart from the first converging portions.

14. The optical fiber coupling connector of claim 11, wherein each of the positioning portions is substantially cylindrical.

15. A photoelectric conversion device comprising:
a circuit board comprising:
    at least two reference portions;
    a light emitting module;
    a light receiving module; and
an optical coupling lens comprising:
    a bottom surface facing the circuit board;
    a top surface opposite to the bottom surface;
    a front surface;
    a rear surface opposite to the front surface, the top surface defining a recess opening through the rear surface, a reflecting surface being formed at a bottom of the recess, the reflecting surface obliquely connecting the front surface to the bottom surface;
    light converging portions formed on the bottom surface, spaced apart to correspond to the light emitting module and the light receiving module; and
    at least two observation portions, spaced apart to correspond to centers of the corresponding at least two reference positions;
    wherein the circuit board is visible from above the lens through the two observations portions, such that the reference portions are accurately aligned with the observation portions via visual inspection to thereby accurately align the light converging portions with the light emitting module and the light receiving module.

* * * * *